United States Patent Office 3,058,337
Patented Oct. 16, 1962

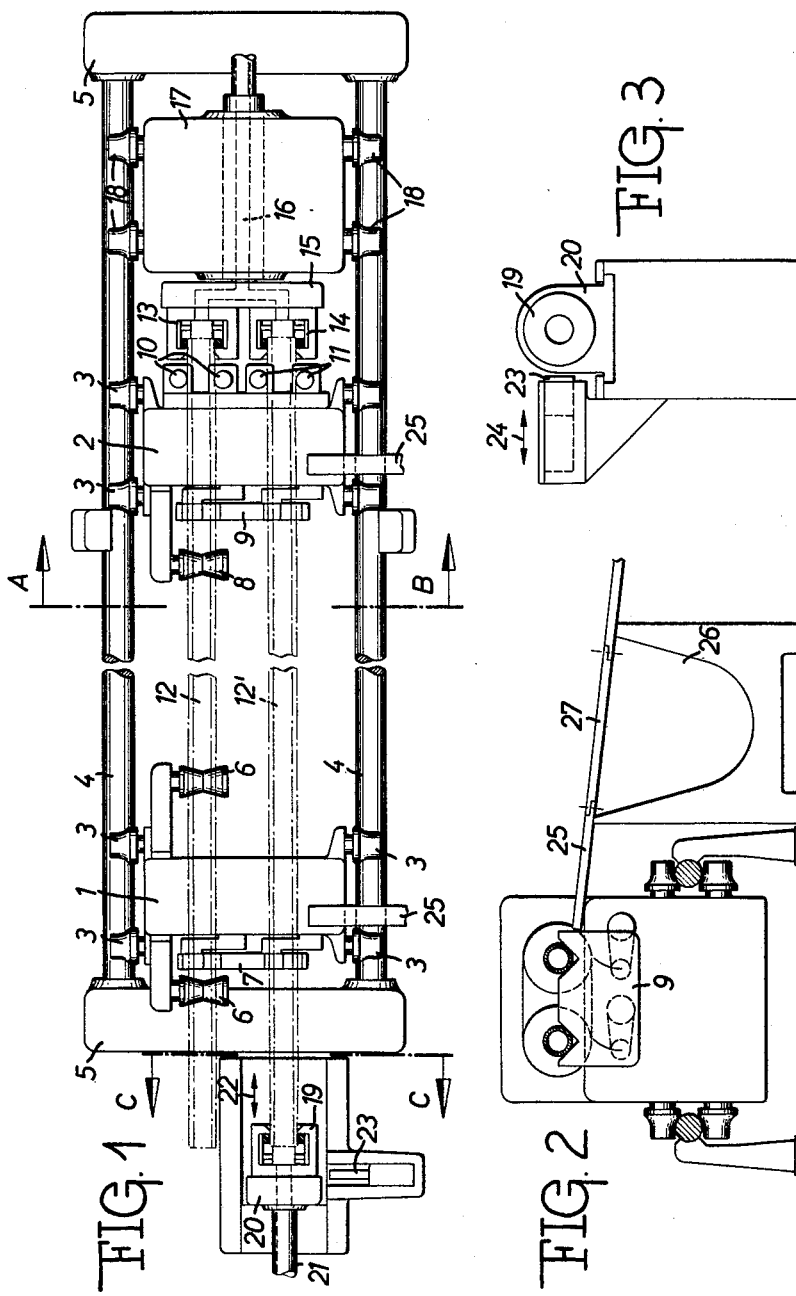

3,058,337
HYDRAULIC PIPE TESTING PRESS
Hans Lindemann, Bielefeld, Germany, assignor to
Th. Calow & Co., Bielefeld, Germany
Filed Sept. 28, 1959, Ser. No. 842,699
Claims priority, application Germany Oct. 1, 1958
13 Claims. (Cl. 73—41)

The present invention relates to improvements in a hydraulic press for testing pipes and especially very long pipes. This press is of a type generally known as such which is provided with at least one sealing head for closing the pipe to be tested at one end and for feeding a pressure fluid such as water through the sealing head into the pipe, and with at least one sealing head for closing the other end of the pipe.

Insofar as the pipes, for example, seamless pipes, are to be subjected to a pressure test for leaks, it is the conventional procedure first to cut the pipe into sections of the desired length and then to machine the two ends of the pipe at least by chamfering them. Since this results in pipes of relatively short lengths, it is necessary for an adequate production of tested pipes to provide a relatively large number of testing apparatus which, in turn, increases the amount of space required for the necessary machinery.

It is an object of the present invention to facilitate such pressure tests considerably and to reduce the number of testing apparatus required in one plant to the greatest possible extent.

This object may be attained by making the pipes to be tested of a considerable length. The production of such long pipes does not involve any particular difficulties. Thus, for example, it is easily possible to produce long pipes of strip metal by spirally winding the same and welding the helical seam. The length of such pipes may easily amount to 300 feet and more and merely depends upon the available space for handling them. Even though each pipe to be tested may be first passed through a straightening machine, such a straightening operation prior to the pressure test is usually not even necessary for helically welded pipes. If the pipes have such a considerable length, it is merely necessary to close the two ends of each pipe by means of a pair of sealing heads through which a pressure fluid or the like is then forced into the pipe. Those points of the pipes which show a leak by the pressure fluid escaping therefrom are then marked and the pipes are subsequently cut apart at these points so that all of the pipe sections obtained will be completely tight.

Although the pressure test of long pipes could be carried out in the same manner as it was done previously on shorter pipes, it is advisable to carry it out in a cycle with the operation of the other required machine tools such as straightening machines, trimming and chamfering machines, thread-cutting machines, etc., so that each pipe is conveyed automatically from one to another of these machines or apparatus.

It is therefore another object of the invention to provide a pipe testing apparatus which is especially adapted to be included into a group of machines and apparatus so as to permit a continuous production of pipes to be carried out at the greatest possible efficiency.

For attaining this purpose, the present invention provides a hydraulic pipe-testing press which is equipped near one end with only one sealing head, while the other end carries a pair of sealing heads which may be shifted transverse to their axes to two different positions in each of which one of the sealing heads of this pair extends coaxially to the first-mentioned sealing head and is thus in the position in which a pipe is to be tested, while the other sealing head of this pair is in a position to receive the next pipe to be tested. The pair of sealing heads is preferably mounted on a turret which is adjustable in the longitudinal direction of the machine and may be rotated about an axis which extends parallel to the axes of the sealing heads and centrally between them. The machine may be further provided with suitable means for arresting the turret in two diametrically opposite positions. In order to permit each pipe to be flushed out prior to the testing operation, it is furthermore advisable to mount the sealing heads so that their axes extend at equally inclined angles to the horizontal plane, while the apexes of these angles are all disposed within the turret. For shifting the pipes transversely from the flushing to the testing position, the invention further provides suitable lifting bars, the movements of which are controlled so as to occur simultaneously with the movements of the turret. For feeding the pipes and for moving them toward and away from the sealing heads, the machine is further equipped with suitable conveying elements carrying rollers for moving the pipes in the longitudinal direction. These rollers are preferably disposed relative to each other at the same angle to the horizontal plane as the axes of the sealing heads. The number of conveying elements required between the sealing heads depends upon the length of the pipes to be tested, and each of them preferably carries not only conveying rollers for the longitudinal movement of the pipes, but also transverse conveying means, such as the mentioned lifting bars. While the conveying rollers on which the pipes are resting usually do not need to be driven because of the inclined position of the pipes, it is advisable to provide the conveying element which is disposed closely adjacent to the turret with two pairs of driven feed rollers for positively inserting the pipe ends into the sealing heads and for withdrawing them therefrom. The axes of these feed rollers at opposite sides of each pipe preferably extend in a direction transverse to the axes of the freely rotatable conveying rollers. Of course, the effect of these additional feed rollers may also be attained by positively driving some or all of the other conveying rollers on which the pipes are fed into the machine.

The supply of the pressure medium, for example, water, may be effected by suitable control means and preferably in such a manner that the water is passed into a pipe to be tested as soon as one of the sealing heads has closed this pipe tightly at one end. Each line through which the water or other pressure medium is passed into the pipes is preferably provided with a check valve to prevent the pressure medium from backing up and flowing out of the pipes. However, while a separate check valve has to be provided in each of the lines leading to the sealing heads in the turret, it is not absolutely necessary also to provide a check valve in the line leading to the third sealing head since the water which is supplied to the pipe through the latter has a much greater pressure than the water which is supplied through the sealing heads on the turret.

The elements carrying the conveying rollers and lifting bars as well as the turret and the third sealing head are adapted to be moved in the longitudinal direction of the machine and to be secured in various positions. In order to prevent a pipe which has already been tested and freed from the sealing heads from re-entering the third sealing head during the removal of the pipe from the machine, this third sealing head is associated with a stop member which is movable automatically in a direction transverse to the axis of this sealing head and to a position in front of the end of the tested pipe as soon as the third sealing head is withdrawn from the pipe at the end of the testing process.

The means for rotating the turret and/or the means for arresting it in either of its two positions may also be omitted and their function be carried out by the lifting bars which, when swiveled to convey one pipe from the stand-by or flushing position to the testing position, also transmit such rotary motion through this pipe to the turret.

These and other objects, features, and advantages of the present invention will become more apparent from the following detailed description thereof, particularly when the same is read with reference to the accompanying drawings, in which—

FIGURE 1 shows a plan view of a pipe testing press according to the invention;

FIGURE 2 shows a cross section taken along line A—B of FIGURE 1; while

FIGURE 3 shows a view of a part of the pipe testing press, as seen in the direction of the arrows C in FIGURE 1.

Referring to the drawings, the pipe testing machine according to the invention consists of a plurality of conveying elements 1 and one conveying element 2 for feeding and conveying as well as supporting the pipes to be tested. The number of conveying elements 1 depends upon the length of the pipes. Each of the conveying elements 1 and 2 is slidable in the longitudinal direction of the machine on rollers 3 which are movable along supporting and guiding bars 4, and it is also adapted to be secured at any point along bars 4 in a fixed position. These guide bars 4 are mounted on stands 5. Each conveying element 1 of the particular embodiment shown in the drawings is equipped with two double-conical rollers 6 which are preferably driven, although this is not absolutely required since the points of engagement of the individual conveying rollers with the respective pipe lie within a plane which is disposed at an angle to the horizontal plane so that the pipes will slide downwardly along rollers 6 by gravity. Each conveying element 1 also carries a transverse lifting bar 7 which is adapted to be moved by a pair of cranks to carry out a circular movement and thereby to convey the pipes in a transverse direction.

Conveying element 2 is provided with a conveying roller 8 similar to rollers 6 and also carries a transverse lifting bar 9 similar to lifting bars 7 on conveying elements 1 and two pairs of feed rollers 10 and 11 which are rotatable about vertical axes. Feed rollers 10 are adapted to feed the pipe 12 to a sealing head 13. This sealing head 13 as well as a second sealing head 14 are mounted on a turret 15 which is rotatable about an axis 16 in a housing 17 which is slidable horizontally by rollers 18 resting on the supporting and guiding bars 4 and is also adapted to be fixed in any desired position on bars 4.

Sealing head 13 is operatively associated with the roller mechanism comprising the conveying rollers 6, 8, and 10, while sealing head 14 is disposed coaxially to a third sealing head 19 which is mounted in a housing on a spindle 21 which permits the sealing head 19 to be moved back and forth in the direction shown by arrow 22 in FIGURE 1.

As soon as a pipe 12 is properly sealed at one end by sealing head 13, a limit switch, not shown, is actuated to energize a timing relay which, in turn, operates a control valve whereby water is forced into pipe 12 at a pressure of, for example, 5 atmospheres to flush out the pipe. Due to the inclined plane of the roller mechanism 6, 8, 10 and therefore of pipe 12, the pipe will be filled almost completely with water before it will run out at the free end of the pipe. Simultaneously with the operation of the mentioned control valve, a second timing relay is also energized whereby after a certain length of time the lifting bars 7 and 9 are swiveled so as to transfer the flushed pipe 12 in a direction, transverse to its longitudinal axis and to the position 12' in front of the third sealing head 19 which is then in its retracted position. At the same time, turret 15 follows the circular movement of pipe 12 and thereby reverses the relative position of the two sealing heads 13 and 14. Thereupon, the control valve is shut off through which the water for flushing out the pipe was supplied to sealing head 13. A check valve in the line leading to sealing head 13 prevents the water which has been forced into the pipe from backing out of the pipe. Housing 20 is then shifted forwardly until sealing head 19 covers and seals the other end of pipe 12 which is then in the position as shown at 12'. A pump, not shown, is then started to force a pressure medium, for instance, water, at a pressure of, for example, 60 atmospheres through sealing head 13 into pipe 12'. The pressure rise in the pipe to 60 atmospheres proceeds very quickly since the pipe was already previously almost completely filled with water from the flushing operation.

After lifting bars 7 and 9 have transferred pipe 12 from its flushing position to its testing position 12', a suitable stop member, not shown, which prevents a premature feeding of a new pipe to the machine, for example, from a previous straightening machine, is withdrawn so that such new pipe can slide downwardly along rollers 6 and 8 and between rollers 10 into the sealing head which is then in the place of sealing head 13 as shown in FIGURE 1. The movement of this stop member may be controlled either by the operation of one of the lifting bars 7 and 9 or by the movement of housing 20 to seal the left end of pipe 12'.

After pipe 12' has been tested for the prescribed length of time under pressure, housing 20 is shifted back to its original position to withdraw sealing head 19 from the end of the pipe. The pair of rollers 11 on conveying member 2 is then started to shift pipe 12' to such an extent toward the left that its right end will slip out of the sealing head 14, while its left end will engage with a stop member 23 which, after housing 20 has passed sufficiently toward the left, is automatically propelled forwardly in the direction as shown by arrow 24 in FIGURE 3 by suitable means controlled by such movement of housing 20. Thus, both ends of pipe 12' are freed and the water can run out of the pipe.

In the meantime, the new pipe 12 was fed along rollers 6, 8, and 10 and inserted into sealing head 13 as shown in FIGURE 1. The same operation as above described is then repeated. At the next transverse movement of lifting bars 7 and 9 to transfer pipe 12 from its flushing position to its pressure-testing position, the already tested pipe 12' is also lifted out of its testing position and conveyed away transversely, for example, by rolling down over guide rails 25 which are inclined so as to lead the tested pipe to the next machine, for example, a trimming and reaming or chamfering machine. This machine may also be provided with suitable retaining means known as such to prevent the pipes from entering the machine at the improper time. If desired, a collecting device 26 may also be associated with guide rails 25 to store the pipes temporarily if they cannot be taken up immediately by the following machine. If this becomes necessary, bridge portions 27 which normally extend over the collecting device 26 are removed or pivoted laterally so that the respective pipe will drop into the collecting device.

Although my invention has been illustrated and described with reference to the preferred embodiment thereof, I wish to have it understood that it is in no way limited to the details of such embodiment but is capable of numerous modifications within the scope of the appended claims. Thus, for example, the feed rollers 6 and 8 may also be mounted on lifting bars 7 and 9, respectively.

What I claim is:

1. A hydraulic pipe testing press comprising a frame, a pair of sealing heads near one end of said frame for sealing one end of each of a pair of pipes toward the outside, means for supplying a pressure fluid through at least one of said pair of sealing heads into at least one of said pipes, a third sealing head near the other end of said frame for sealing the other end of said one of said pipes, and means for moving said pair of sealing heads in a direction transverse to the axes of said sealing heads into at least two positions in each of which a different one of said sealing heads of said pair extends coaxially to said third sealing head for testing a pipe, while the other sealing head of said pair is in a position to receive another pipe.

2. A hydraulic pipe testing press as defined in claim 1, further comprising a turret for mounting said pair of sealing heads, means for mounting said turret so as to be rotatable about a central axis and to be adjustable to different positions along said axis, said axis extending parallel to and centrally between the axes of said pair of sealing heads, and means for releasably arresting said turret in at least two diametrically opposite positions corresponding to said positions of the pair of sealing heads.

3. A hydraulic pipe testing press as defined in claim 2, in which the axes of all of said sealing heads lie within a plane extending at an inclined angle to a horizontal plane extending through said turret, the angle formed between said plane and said horizontal plane having its apex disposed within said turret.

4. A hydraulic pipe testing press as defined in claim 1, in which said pressure fluid supply means include means for supplying said pressure fluid to at least said one of the pair of pipes as soon as said third sealing head has sealed said other end of said one pipe, line means conveying said pressure fluid, and check valve means operatively associated with each said line means.

5. A hydraulic pipe testing press as defined in claim 2, further comprising means for moving the pipes in a transverse direction simultaneously with the rotary movement of said turret.

6. A hydraulic pipe testing press as defined in claim 5, further comprising conveying means adjustable to different axial positions between the two ends of said frame, conveying rollers rotatably mounted on said conveying means for moving the pipes longitudinally in both directions, said transverse moving means being also mounted on said conveying means.

7. A hydraulic pipe testing press as defined in claim 6, in which the axes of all said sealing heads and said conveying rollers lie within a plane extending at an inclined angle with respect to the horizontal plane extending through said turret.

8. A hydraulic pipe testing press as defined in claim 6, in which one of said conveying means is disposed adjacent to said turret, and two pairs of positively driven rollers rotatably mounted on said last conveying means, the two rollers of each pair being adapted to engage with opposite sides of a pipe, said rollers having axes extending transverse to the axes of said conveying rollers.

9. A hydraulic pipe testing press comprising a frame, a pair of sealing heads near one end of said frame for sealing one end of each of a pair of pipes toward the outside, means for supplying a pressure fluid through at least one of said pair of sealing heads into at least one of said pipes, a third sealing head near the other end of said frame for sealing the other end of one of said pipes, means for moving said pair of sealing heads in a direction transverse to the axes of said sealing heads to two positions in each of which one of said sealing heads of said pair extends coaxially of said third sealing head for testing a pipe while the other sealing head of said pair is in the position to receive another pipe, means for moving said third sealing head in the axial direction over one end of said one pipe and for retracting said sealing head from said pipe after being tested, a stop member associated with said third sealing head, and means for moving said stop member in a direction transverse to the movement of said third sealing head and in front of said pipe end as soon as said third sealing head has retracted from said pipe end.

10. A hydraulic pipe testing press comprising a frame, first sealing means near one end of said frame including a pair of sealing heads for sealing one end of each of a pair of pipes, second sealing means near the other end of said frame including a third sealing head, means for moving each of said pair of sealing heads and the pipe sealed thereby into two positions including a common position alternately occupied by the two sealing heads of said pair, the sealing head in said common position extending substantially coaxially to said third sealing head, each of said pair of sealing heads being in a position to receive another pipe in the other of said two positions, said third sealing head sealingly engaging the pipe in said common position, and means for supplying fluid to said pipes so that the pair of pipes are alternately tested.

11. A hydraulic pipe testing press as defined in claim 10, wherein said means for supplying fluid to said pipes extends through said pair of sealing heads and includes means for flushing the one of said pipes in said other of the two positions and means for supplying pressure fluid to the one of said pipes in said common positions to thereby test said pipe.

12. A hydraulic pipe testing press as defined in claim 10, wherein said means for moving said pair of sealing heads into said two positions includes turret means for mounting said pair of sealing heads, said turret means being rotatable about a central axis, and means for arresting each of said pair of sealing heads in the said two positions thereof, and further including means for moving said third sealing head axially with respect to the pipes sealed thereby to sealingly engage the same when in said common position.

13. A hydraulic pipe testing press as defined in claim 1, further comprising means for moving said third sealing head in the axial direction over one end of the pipe to be tested and for retracting said sealing head from said pipe after being tested.

References Cited in the file of this patent
UNITED STATES PATENTS

| | | |
|---|---|---|
| 2,617,292 | Grau | Nov. 11, 1952 |
| 2,866,334 | Rada et al. | Dec. 30, 1958 |
| 2,947,165 | Kirchner et al. | Aug. 2, 1960 |